United States Patent
Genda

(10) Patent No.: US 9,843,695 B2
(45) Date of Patent: Dec. 12, 2017

(54) INFORMATION PROCESSING SYSTEM FOR ACQUIRING THE STATE OF INFORMATION PROCESSING APPARATUSES AND DETERMINING WHETHER TO RESTRICT A REQUESTED PROCESS

(71) Applicant: FUJI XEROX CO., LTD., Tokyo (JP)

(72) Inventor: Kohei Genda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/710,310

(22) Filed: May 12, 2015

(65) Prior Publication Data

US 2016/0119497 A1    Apr. 28, 2016

(30) Foreign Application Priority Data

Oct. 27, 2014   (JP) ................................. 2014-218701

(51) Int. Cl.
*H04N 1/00* (2006.01)

(52) U.S. Cl.
CPC ..... *H04N 1/00925* (2013.01); *H04N 1/00244* (2013.01); *H04N 1/00344* (2013.01); *H04N 1/00474* (2013.01); *H04N 1/00477* (2013.01); *H04N 2201/0094* (2013.01)

(58) Field of Classification Search
CPC ........................ H04N 1/00925; H04N 1/00344
See application file for complete search history.

(56) References Cited

U.S. PATENT DOCUMENTS

| | | | | |
|---|---|---|---|---|
| 7,903,268 | B2* | 3/2011 | Aoki | G03G 15/5012 347/19 |
| 8,175,849 | B2* | 5/2012 | Yamashita | G03G 15/502 702/184 |
| 8,218,168 | B2* | 7/2012 | Iwata | G03G 15/5012 358/1.13 |
| 2009/0278305 | A1* | 11/2009 | Takemura | B65H 7/08 271/228 |
| 2010/0202014 | A1* | 8/2010 | Matsuyama | G06F 3/121 358/1.15 |
| 2010/0322640 | A1* | 12/2010 | Yamada | G03G 15/5079 399/11 |
| 2010/0328698 | A1* | 12/2010 | Toriyabe | G06F 3/121 358/1.14 |

(Continued)

FOREIGN PATENT DOCUMENTS

| | | |
|---|---|---|
| JP | 06-089050 A | 3/1994 |
| JP | 2008-070800 A | 3/2008 |

(Continued)

*Primary Examiner* — Benjamin O Dulaney
(74) *Attorney, Agent, or Firm* — Oliff PLC

(57) ABSTRACT

An information processing system includes an acquisition unit that acquires internal information of an information processing apparatus, an acquisition unit that acquires, from a user, an execution request for a process to be executed, and a process executing unit that executes the process in accordance with the execution request. In a case where the acquired internal information indicates a symptom of a malfunction occurrence in the information processing apparatus, and where the requested process is determined to affect the malfunction occurrence, the process executing unit executes a restriction process in which execution of the requested process is restricted.

13 Claims, 10 Drawing Sheets

| MODEL INFORMATION | UM OCCURRENCE CAUSE | OCCURRENCE CONDITION | COUNTERMEASURE |
|---|---|---|---|
| N5100 | PaperFeedJam | DADF | PLATEN |
| N5100 | PaperFeedDupJam | OUTPUT: DOUBLE-SIDED | OUTPUT: SINGLE-SIDED |
| | | | USING ANOTHER APPARATUS |
| N5100 | PaperHandingJam | PRINTING | USING ANOTHER APPARATUS |
| | | | |

(56) References Cited

U.S. PATENT DOCUMENTS

| | | | | |
|---|---|---|---|---|
| 2012/0050784 | A1* | 3/2012 | Kawaura | G06F 3/1207 |
| | | | | 358/1.14 |
| 2012/0069356 | A1* | 3/2012 | Kubo | G06K 15/02 |
| | | | | 358/1.2 |
| 2015/0124279 | A1* | 5/2015 | Iizuka | G06K 15/4055 |
| | | | | 358/1.14 |
| 2015/0186761 | A1* | 7/2015 | Fujii | G03G 15/5029 |
| | | | | 358/1.12 |
| 2016/0092848 | A1* | 3/2016 | Nakajima | G06Q 10/20 |
| | | | | 705/26.81 |

FOREIGN PATENT DOCUMENTS

| | | |
|---|---|---|
| JP | 2010-091840 A | 4/2010 |
| JP | 2013-201609 A | 10/2013 |

* cited by examiner

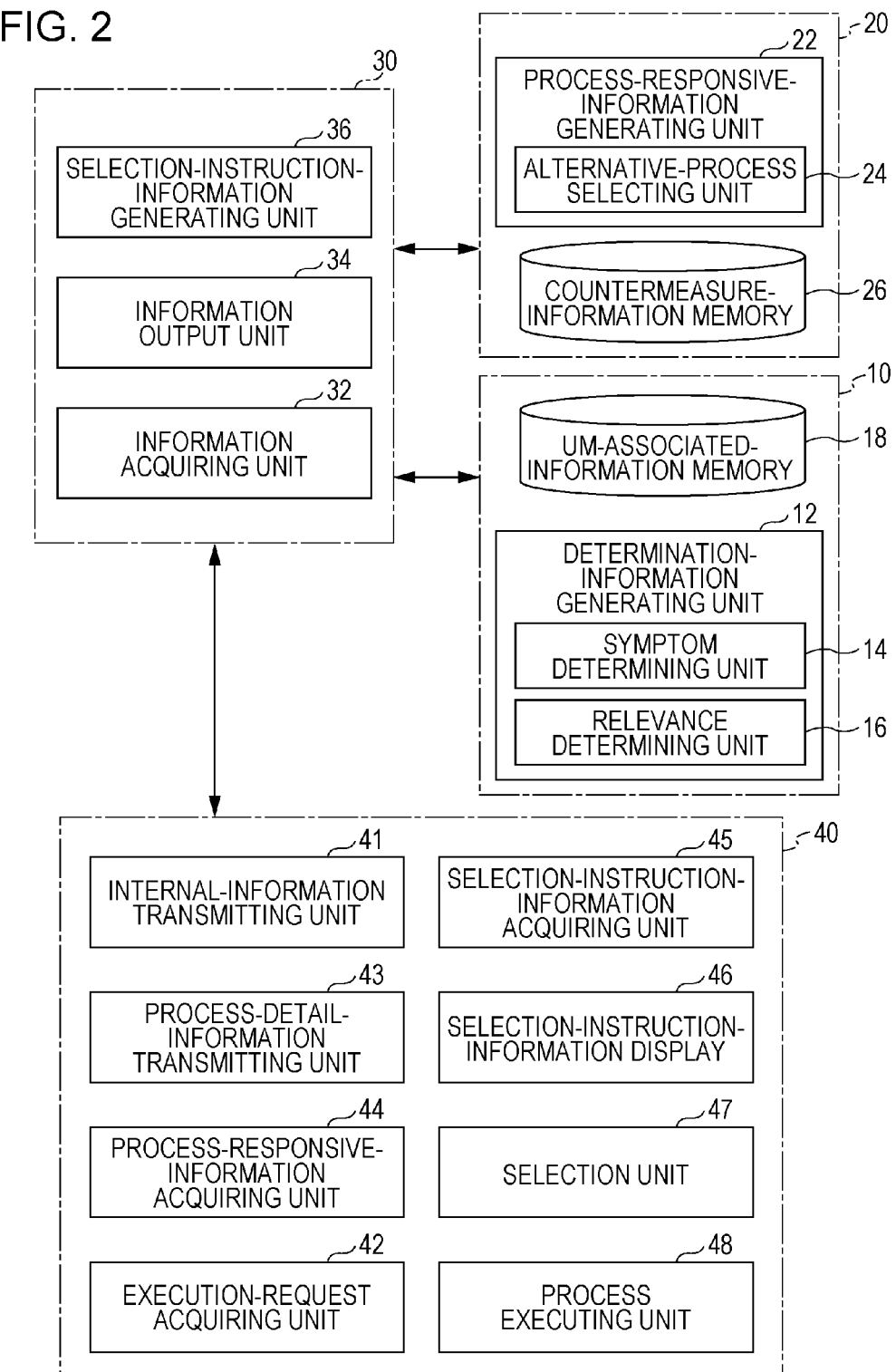

FIG. 3

| UM OCCURRENCE CAUSE | OCCURRENCE CONDITION | INTERNAL STATE ||
|---|---|---|---|
| | | FIRST CONDITION | SECOND CONDITION |
| PaperFeedDupJam | OUTPUT: DOUBLE-SIDED | × ||
| | | a | b |

FIG. 4

| APPARATUS ID | MODEL INFORMATION | PROCESS DETAILS |||
|---|---|---|---|---|
| 001 | N5100 | OUTPUT: DOUBLE-SIDED | THE NUMBER OF COPIES: 50 | N-up: 2 |

FIG. 5

| APPARATUS ID | MODEL INFORMATION | DETERMINATION RESULT | SYMPTOMATIC MALFUNCTION | PROCESS DETAIL |
|---|---|---|---|---|
| 001 | N5100 | SYMPTOM PRESENT | PaperFeed DupJam | OUTPUT: DOUBLE-SIDED |
| | | | | |
| | | | | |

FIG. 6

| MODEL INFORMATION | UM OCCURRENCE CAUSE | OCCURRENCE CONDITION | COUNTERMEASURE |
|---|---|---|---|
| N5100 | PaperFeedJam | DADF | PLATEN |
| N5100 | PaperFeedDupJam | OUTPUT: DOUBLE-SIDED | OUTPUT: SINGLE-SIDED |
|  |  |  | USING ANOTHER APPARATUS |
| N5100 | PaperHandingJam | PRINTING | USING ANOTHER APPARATUS |
|  |  |  |  |

FIG. 7

| PROCESS DETAIL | RESPONSIVE PROCESS | | |
|---|---|---|---|
|  | IDENTICAL PROCESS | ALTERNATIVE PROCESS | |
| OUTPUT: DOUBLE-SIDED | OUTPUT: DOUBLE-SIDED | OUTPUT: SINGLE-SIDED | USED APPARATUS ID: 002 | USED APPARATUS ID: 004 |

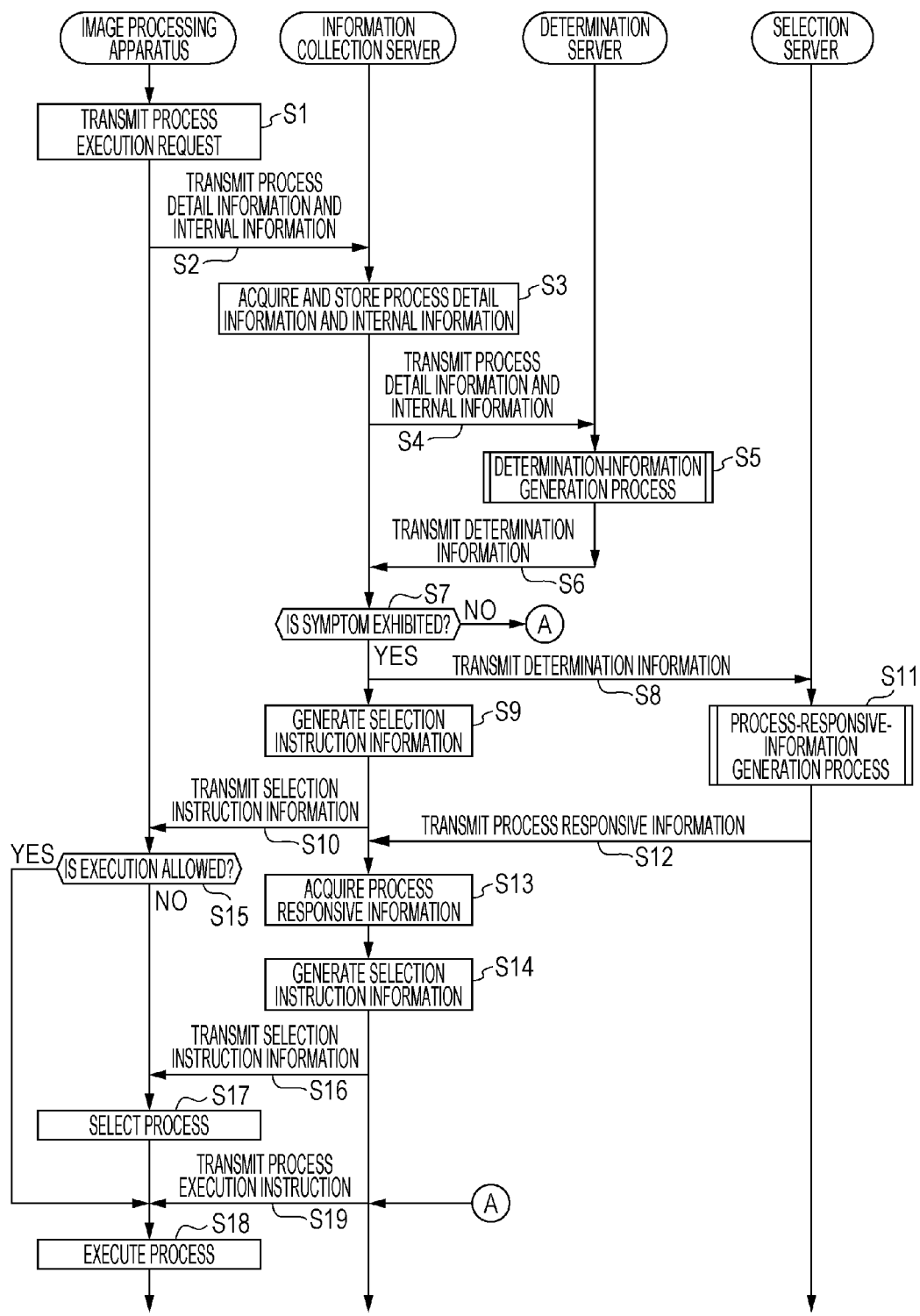

INFORMATION PROCESSING SYSTEM FOR ACQUIRING THE STATE OF INFORMATION PROCESSING APPARATUSES AND DETERMINING WHETHER TO RESTRICT A REQUESTED PROCESS

CROSS-REFERENCE TO RELATED APPLICATIONS

This application is based on and claims priority under 35 USC 119 from Japanese Patent Application No. 2014-218701 filed Oct. 27, 2014.

BACKGROUND

Technical Field

The present invention relates to an information processing system, a non-transitory computer readable medium, and an information processing method.

SUMMARY

According to an aspect of the invention, there is provided an information processing system including an acquisition unit that acquires internal information of an information processing apparatus, an acquisition unit that acquires, from a user, an execution request for a process to be executed, and a process executing unit that executes the process in accordance with the execution request. In a case where the acquired internal information indicates a symptom of a malfunction occurrence in the information processing apparatus, and where the requested process is determined to affect the malfunction occurrence, the process executing unit executes a restriction process in which execution of the requested process is restricted.

BRIEF DESCRIPTION OF THE DRAWINGS

An exemplary embodiment of the present invention will be described in detail based on the following figures, wherein:

FIG. 2 is a functional block diagram illustrating an example of principal functions executed by a determination server, a selection server, an information collection server, and an image processing apparatus according to the present exemplary embodiment;

FIG. 3 is a diagram illustrating unscheduled maintenance (UM)-associated information stored in a UM-associated-information memory;

FIG. 4 is a diagram illustrating an example of process detail information;

FIG. 5 is a diagram illustrating an example of determination information;

FIG. 6 is a diagram illustrating an example of countermeasure information;

FIG. 7 is a diagram illustrating an example of process responsive information;

FIG. 8 is a sequence chart illustrating an example of flow of a process executed by the information processing system according to the present exemplary embodiment;

DETAILED DESCRIPTION

Hereinafter, an exemplary embodiment of the present invention will be described with reference to the drawings. In the description of the present exemplary embodiment, information processing apparatuses are image processing apparatuses 40 taken as an example, but may be other information processing apparatuses.

Figure 1:
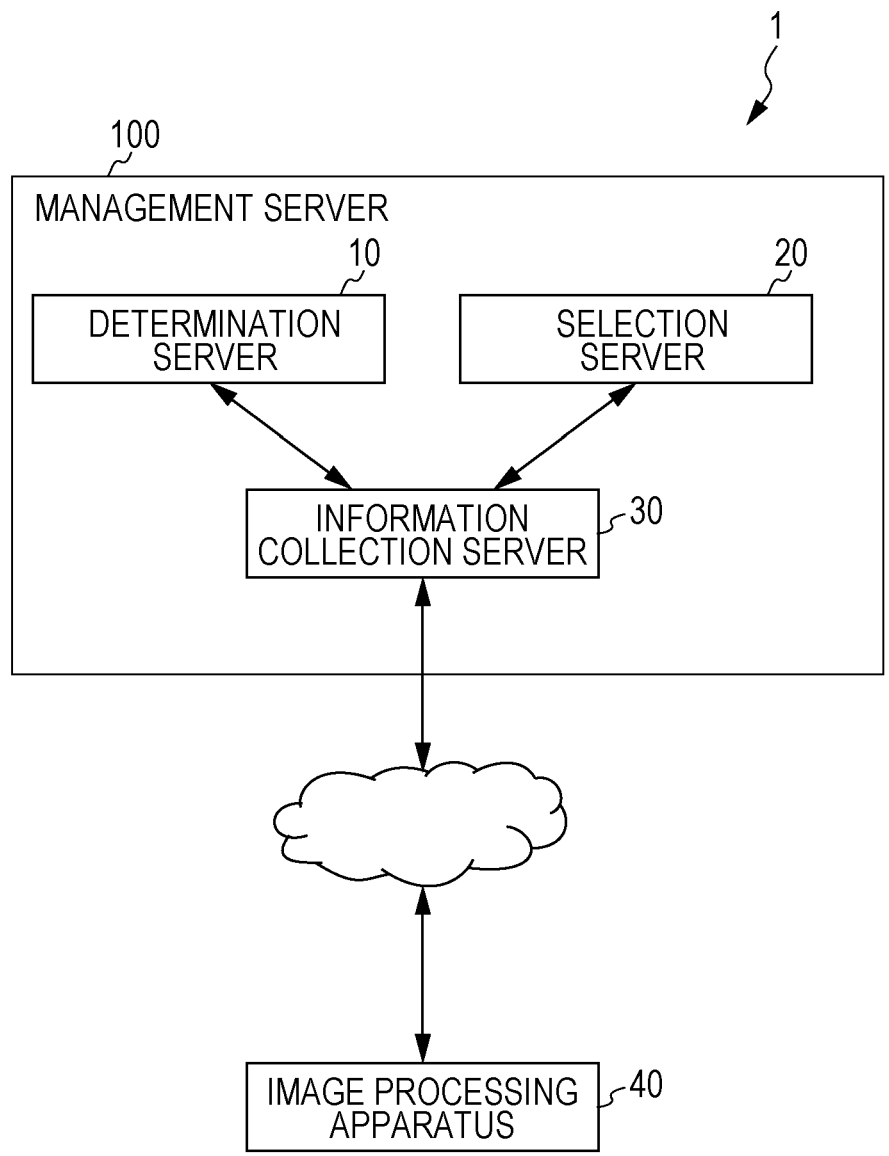
FIG. 1 is a diagram illustrating an example of an overall configuration of an information processing system according to the exemplary embodiment.

FIG. 1 is a diagram illustrating an example of an overall configuration of an information processing system 1 according to an exemplary embodiment of the present invention. The information processing system 1 according to the present exemplary embodiment includes a management server 100 and image processing apparatuses 40. As illustrated in FIG. 1, the management server 100 is connected to each image processing apparatus 40 through a communication network such as a local area network (LAN) or the Internet to communicate with each other.

The management server 100 includes an information collection server 30, a determination server 10, and a selection server 20.

The information collection server 30 is, for example, a server computer and includes a controller, a memory, a communication unit, a display, a mouse, a keyboard, and other devices. The controller is a program-controlling device such as a central processing unit (CPU) that operates according to a program installed in the information collection server 30. Examples of the memory include a memory device, such as a read only memory (ROM) or a random access memory (RAM), and a hard disk drive. Examples of the communication unit include a network board and a wireless LAN module that exchange data with other devices in a wired or wireless manner. In the present exemplary embodiment, the information collection server 30 is a server that mediates among the determination server 10, the selection server 20, and the image processing apparatus 40 to exchange information.

The determination server 10 is, for example, a server computer and includes a controller, a memory, a communication unit, a display, a mouse, a keyboard, and other devices. The controller is a program-controlling device such as a CPU that operates according to a program installed in the determination server 10. Examples of the memory include a memory device, such as a ROM or a RAM, and a hard disk drive. Examples of the communication unit include a network board and a wireless LAN module that exchange data with other devices in a wired or wireless manner.

The selection server 20 is, for example, a server computer and includes a controller, a memory, a communication unit, a display, a mouse, a keyboard, and other devices. The controller is a program-controlling device such as a CPU that operates according to a program installed in the selection server 20. Examples of the memory include a memory device, such as a ROM or a RAM, and a hard disk drive. Examples of the communication unit include a network board and a wireless LAN module that exchange data with other devices in a wired or wireless manner.

The image processing apparatus 40 is, for example, a multifunctional product or a printer and includes a controller, a memory, a communication unit, a display, an operation device, a scanner, a printing unit, and other devices. The controller is a program-controlling device such as a CPU that operates according to a program installed in the image processing apparatus 40. Examples of the memory include a memory device, such as a ROM or a RAM, and a hard disk drive. Examples of the communication unit include a network board and a wireless LAN module that exchange data with other devices in a wired or wireless manner.

In the present exemplary embodiment, various sensors are incorporated into the image processing apparatus 40 and detect various internal states of the image processing apparatus 40. Internal information indicating the internal state detected in the image processing apparatus 40 is transmitted to the management server 100.

The information processing system 1 is a system for managing maintenance work for the image processing apparatus 40 by using internal information acquired from the image processing apparatus 40. A user of the image processing apparatus 40 is different from a maintenance person who maintains the image processing apparatus 40. To maintain the image processing apparatus 40, the maintenance person visits a place where the image processing apparatus 40 is installed. To maintain the image processing apparatus 40, the maintenance person also remotely operates the image processing apparatus 40 through the management server 100 and a communication device by using another information processing apparatus or provides telephone support. The maintenance is performed in response to the user's request provided when a malfunction occurs, or is performed at the discretion of the maintenance person by referring to internal information.

In the information processing system 1, a symptom of UM to be requested by a user is determined by using internal information acquired from the image processing apparatus 40, and a responsive process for preventing UM from actually occurring is output to the image processing apparatus 40.

Hereinafter, a specific example of functions implemented by the information processing system 1 will be described. FIG. 2 is a functional block diagram illustrating an example of principal functions executed by the determination server 10, the selection server 20, the information collection server 30, and the image processing apparatus 40 according to the present exemplary embodiment. As illustrated in FIG. 2, the determination server 10 in the present exemplary embodiment includes, for example, a determination-information generating unit 12 and a UM-associated-information memory 18 in a functional configuration, the determination-information generating unit 12 including a symptom determining unit 14 and a relevance determining unit 16. Among these functions, the functions of the symptom determining unit 14, the relevance determining unit 16, and the determination-information generating unit 12 are implemented in such a manner that the controller executes a program stored in the memory. The program is provided for the determination server 10 through a computer readable information storage medium such as an optical disk, a magnetic disk, a magnetic tape, a magneto-optical disk, or a flash memory or through the communication network such as the Internet. The UM-associated-information memory 18 is implemented by the memory.

The selection server 20 according to the present exemplary embodiment includes a process-responsive-information generating unit 22 and a countermeasure-information memory 26 in a functional configuration, the process-responsive-information generating unit 22 including an alternative-process selecting unit 24. Among these functions, the alternative-process selecting unit 24, and the process-responsive-information generating unit 22 are implemented in such a manner that the controller executes a program stored in the memory. The program is provided for the selection server 20 through a computer readable information storage medium such as an optical disk, a magnetic disk, a magnetic tape, a magneto-optical disk, or a flash memory or through the communication network such as the Internet. The countermeasure-information memory 26 is implemented by the memory.

The information collection server 30 according to the present exemplary embodiment includes, for example, an information acquiring unit 32, an information output unit 34, and a selection-instruction-information generating unit 36 in a functional configuration. The functions are implemented in such a manner that the controller executes a program stored in the memory. The program is provided for the information collection server 30 through a computer readable information storage medium such as an optical disk, a magnetic disk, a magnetic tape, a magneto-optical disk, or a flash memory or through the communication network such as the Internet.

The image processing apparatus 40 according to the present exemplary embodiment includes, for example, an internal-information transmitting unit 41, an execution-request acquiring unit 42, a process-detail-information transmitting unit 43, a process-responsive-information acquiring unit 44, a selection-instruction-information acquiring unit 45, a selection-instruction-information display 46, a selection unit 47, and a process executing unit 48 in a functional configuration. The functions are implemented in such a manner that the controller executes a program stored in the memory. The program is provided for the image processing apparatus 40 through a computer readable information storage medium such as an optical disk, a magnetic disk, a magnetic tape, a magneto-optical disk, or a flash memory or through the communication network such as the Internet.

The symptom determining unit 14 of the determination server 10 determines whether an internal state indicated by internal information transmitted by the image processing apparatus 40 satisfies a first condition. The first condition is less stringent than a second condition under which the image processing apparatus 40 is determined to have a malfunction. The second condition represents a state that is an indicator of a malfunction occurrence in the image processing apparatus 40. The first condition less stringent than the second condition represents a state that is a symptom of a UM occurrence. Specifically, a state specified by the first condition is a better state than a state specified by the second condition. In the state specified by the first condition, UM is expected to occur with the elapse of time or depending on the use condition of the image processing apparatus 40. The term "malfunction" refers to a state, of the image processing apparatus 40, in which the image processing apparatus 40 requires maintenance. The malfunction includes a malfunction recognized by the user and a malfunction that is not recognized by the user but is identified by a maintenance person. The malfunction also includes a malfunction, such as paper jamming, detected as internal information by a sensor in the image processing apparatus 40 and an image quality defect or the like that is difficult to be directly detected by the sensor.

The first and second conditions are in advance stored as UM-associated information in the UM-associated-information memory 18 of the determination server 10, in association with UM occurrence causes and occurrence conditions. The UM occurrence causes are each a malfunction that causes the user to request maintenance, among malfunctions of the image processing apparatus 40. The occurrence conditions each represent a process detail. Execution of the process causes a malfunction that serves as a UM occurrence cause. FIG. 3 is a diagram illustrating UM-associated information stored in the UM-associated-information memory 18. As illustrated in FIG. 3, in the UM-associated information, each UM occurrence cause is associated with an occurrence condition and one or more internal states, and each internal state is associated with the first and second conditions. As described above, an internal state associated with a UM occurrence cause is an internal state that may be expressed by using a value such as the accumulated number of times of driving a member or a toner density value and is used as an indicator of the UM occurrence cause.

The first and second conditions may be worked out on the basis of information regarding UM activities having occurred in the past. For example, every time a UM activity occurs, a value of an internal state associated with a UM occurrence cause is acquired, and a UM occurrence cause, the value of the internal state, and details of the maintenance are associated with each other and stored as maintenance information in the memory. The details of the maintenance include the date and time of the maintenance activity and a specific detail (such as a toner replacement or a parts replacement) of the maintenance activity. A value of an internal state to serve as a condition for a UM occurrence is statistically calculated for each UM occurrence cause on the basis of such maintenance information. Such a calculated value of the internal state to serve as a condition for a UM occurrence may be used as the second condition. The first condition is set at a value smaller than the value of the second condition, for example, 80% of the second condition.

The relevance determining unit 16 of the determination server 10 determines relevance between a process detail included in process detail information and an internal state determined to satisfy the first condition. A result of determination performed by the symptom determining unit 14 of the determination server 10 and the process detail information acquired from the information collection server 30 are used for the relevance determination. As illustrated in FIG. 4, the process detail information includes an apparatus ID of the image processing apparatus 40, model information of the image processing apparatus 40, and process details indicating setting of the image processing apparatus 40. The relevance determining unit 16 herein determines a possibility of UM caused by execution of the process indicated by the process details included in the process detail information. Specifically, the relevance determining unit 16 determines the relevance on the basis of the result of determination performed by the symptom determining unit 14 of the determination server 10, the process detail information, and the UM-associated information. If a process indicated in the UM-associated information by the occurrence condition associated with the internal state determined by the symptom determining unit 14 to satisfy the first condition matches a process indicated by the process details included in the process detail information, the relevance determining unit 16 determines that there is relevance.

The determination-information generating unit 12 of the determination server 10 generates determination information indicating results of the determination performed by the symptom determining unit 14 and the relevance determining unit 16. FIG. 5 is a diagram illustrating an example of the determination information. As illustrated in FIG. 5, an apparatus ID, model information, a determination result, a symptomatic malfunction, and a process detail are associated with each other in the determination information. The apparatus ID is an identifier identifying a corresponding one of the image processing apparatuses 40 that has transmitted the internal state. The model information is information indicating the type of the image processing apparatus 40 having transmitted the internal state. The determination result represents a result of determination, by the symptom determining unit 14, of the internal state transmitted by the image processing apparatus 40. In other words, the determination result indicates whether the internal state satisfies the first condition, that is, the presence or the absence of a symptom of a UM occurrence. The symptomatic malfunction represents a malfunction exhibiting a symptom of UM to be caused by executing a process indicated by the process detail included in the process detail information. The symptomatic malfunction is herein defined as follows. If a process indicated by the occurrence condition associated with the internal state determined by the symptom determining unit 14 to satisfy the first condition in the UM-associated information matches a process indicated by the process detail included in the process detail information, a UM occurrence cause associated with the internal state is the symptomatic malfunction. The process detail is included in the process detail information, and the process exhibits a symptom of UM to be caused by executing the process indicated by the process detail. If the symptom determining unit 14 determines that the internal state does not satisfy the first condition (a symptom of a UM occurrence is absent), or if the relevance determining unit 16 determines that there is no relevance, information indicating the absence of a symptom is associated with the determination result, and nothing is associated with the symptomatic malfunction.

The countermeasure-information memory 26 of the selection server 20 stores countermeasure information indicating the way of coping with, for example, a UM occurrence cause in the present exemplary embodiment. FIG. 6 is a diagram illustrating an example of countermeasure information. As illustrated in FIG. 6, the countermeasure information includes model information indicating the model of the image processing apparatus 40, a malfunction as a UM occurrence cause, an occurrence condition indicating a condition under which a malfunction as a UM occurrence cause occurs, and a countermeasure for preventing a malfunction to serve as a UM occurrence cause. In the countermeasure information, each UM occurrence cause is associated with one or more countermeasures. The countermeasures include a countermeasure in which setting of the malfunctioning image processing apparatus 40 is changed and a countermeasure in which an image processing apparatus 40 different from the malfunctioning image processing apparatus 40 is used.

The process-responsive-information generating unit 22 of the selection server 20 generates process responsive information as a countermeasure for a related process that affects an internal state determined by the symptom determining unit 14 to satisfy the first condition. In a case where the related process that affects an internal state determined by the symptom determining unit 14 to satisfy the first condition is executed, the internal state determined to satisfy the first condition might satisfy the second condition. In other words, execution of the related process might cause UM. In the present exemplary embodiment, a related process that affects an internal state determined by the symptom determining unit 14 to satisfy the first condition (hereinafter, referred to as a UM-symptomatic process) corresponds to a process serving as an occurrence condition in the countermeasure information stored in the countermeasure-information memory 26. The UM-symptomatic process is determined on the basis of determination information and countermeasure information stored in the countermeasure-information memory 26. Specifically, the UM-symptomatic process corresponds to a process serving as the occurrence condition, in the countermeasure information, associated with a UM occurrence cause matching a symptomatic malfunction included in the determination information. The process-responsive-information generating unit 22 selects a process corresponding to the UM-symptomatic process and generates process responsive information. FIG. 7 is a diagram illustrating an example of process responsive information. As illustrated in FIG. 7, a process detail (a UM-symptomatic process in this case) included in the process detail information is associated with a responsive process in the process responsive information. The responsive process includes executing a process indicated by the process detail without any change (corresponding to an identical process in FIG. 7) and executing a process serving as an alternative to the process indicated by the process detail (corresponding to an alternative process in FIG. 7). The process responsive information illustrated in FIG. 7 includes the identical process and the alternative process as the responsive process, but may include only the alternative process as the responsive process. The alternative process includes, for example, causing another device to execute the identical process as the process indicated by the process detail and executing a process indicated by the process detail by partially changing the setting of the process. The alternative process is selected by the alternative-process selecting unit 24 of the selection server 20.

The alternative-process selecting unit 24 of the selection server 20 selects an alternative process to be replaced with the UM-symptomatic process. In the present exemplary embodiment, the alternative-process selecting unit 24 of the selection server 20 selects an alternative process included in the process responsive information generated by the process-responsive-information generating unit 22 of the selection server 20. The alternative process is selected on the basis of the countermeasure information stored in the countermeasure-information memory 26. The alternative-process selecting unit 24 selects one or more alternative processes from one or more alternative candidate processes that are countermeasures in the countermeasure information that are associated with a UM occurrence cause that matches a symptomatic malfunction included in the determination information. The alternative-process selecting unit 24 may select all of the alternative candidate processes as the alternative processes or may select one or more alternative processes from multiple alternative candidate processes. The alternative-process selecting unit 24 may also select one or more alternative processes from multiple alternative candidate processes in accordance with priority. The priority is determined on the basis of, for example, UM occurrence possibilities. Specifically, among multiple alternative candidate processes, high priority is given to an alternative process associated with a good internal state of the image processing apparatus 40. In addition, high priority may be given to an alternative process in which setting of the currently processing image processing apparatus 40 is changed over an alternative process in which another image processing apparatus 40 is used. Alternatively, high priority may be given to the alternative process in which another image processing apparatus 40 is used.

In a case where a countermeasure in the countermeasure information is using another image processing apparatus 40, the alternative-process selecting unit 24 of the selection server 20 acquires a list of usable other image processing apparatuses 40 from the information collection server 30.

The multiple image processing apparatuses 40 are managed as a group on a per base office basis, and base-office association information indicating information regarding the image processing apparatuses 40 is stored in the memory of the information collection server 30. The base offices are set up in units of a sub-network such as a business facility or a department, and each base office includes one or more image processing apparatuses 40. In the base-office association information, an apparatus ID and state information are associated with each other on a per base-office information basis, the apparatus ID identifying the image processing apparatus 40 in a corresponding one of the base offices, the state information indicating a state of the image processing apparatus 40 indicated by the apparatus ID. The state information indicates, for example, an installation place, availability, or use frequency of the image processing apparatus 40, and may be acquired by the information collection server 30 by regularly acquiring the state information from the image processing apparatus 40. The alternative-process selecting unit 24 of the selection server 20 acquires a list of apparatus IDs and the state information from the information collection server 30, the apparatus IDs being associated with the same base office as that associated with the apparatus ID included in the determination information. The alternative-process selecting unit 24 selects one or more image processing apparatuses 40 to be used in an alternative process, by using the acquired list of the apparatus IDs and the state information.

Note that the alternative-process selecting unit 24 may select the one or more image processing apparatuses 40 to be used in the alternative process on the basis of the state information of the image processing apparatuses 40 indicated by the respective apparatus IDs associated with the same base office as the base office where the image processing apparatus 40 having the apparatus ID in the determination information is installed. Specifically, the alternative-process selecting unit 24 may select any image processing apparatus 40 that is in a good state. For example, the alternative-process selecting unit 24 may select any image processing apparatus 40 that is in a ready state or any frequently used (or less frequently used) image processing apparatus 40. The alternative-process selecting unit 24 may also select the one or more image processing apparatuses 40 in the alternative process on the basis of the degree of goodness of acquired states of the image processing apparatuses 40, the degree of goodness being determined by using internal information and the result of determination performed by the symptom determining unit 14 of the determination server 10. For example, the alternative-process selecting unit 24 may also preferentially select any image processing apparatus 40 that is not in the internal state determined by the symptom determining unit 14 to satisfy the first condition of the determination server 10. The alternative-process selecting unit 24 may also preferentially select any image processing apparatus 40 located close to the currently processing image processing apparatus 40 on the basis of information indicating installation places of the image processing apparatuses 40. The alternative-process selecting unit 24 may also acquire user information from the information collection server 30 to preferentially select any image processing apparatus 40 frequently used by users. The user information indicates a user of the image processing apparatus 40 and may be stored in advance in the memory of the information collection server 30. The user information includes a user identifier (user ID) for identifying the user, department information indicating a department to which the user belongs, and an apparatus identifier (apparatus ID) indicating the image processing apparatus 40 usually used by the user.

The information acquiring unit 32 of the information collection server 30 acquires the internal information transmitted by the internal-information transmitting unit 41 of each image processing apparatus 40, the process detail information transmitted by the process-detail-information transmitting unit 43 of the image processing apparatus 40, the determination information generated by the determination-information generating unit 12 of the determination server 10, the process responsive information generated by the process-responsive-information generating unit 22 of the selection server 20, and the like. The information acquiring unit 32 stores the information in the memory of the information collection server 30.

The information output unit 34 of the information collection server 30 outputs the information stored in the memory of the information collection server 30 to the image processing apparatus 40, the determination server 10, and the selection server 20.

The selection-instruction-information generating unit 36 of the information collection server 30 generates execution selection instruction information and responsive-process selection instruction information, the execution selection instruction information causing the user to select whether to execute a UM-symptomatic process, the responsive-process selection instruction information causing the user to select a responsive process on the basis of the process responsive information provided for the UM-symptomatic process. In response to a request from the user, the selection-instruction-information generating unit 36 generates the execution selection instruction information causing the user to select whether to execute the UM-symptomatic process. In the present exemplary embodiment, in a case where the determination information generated by the determination-information generating unit 12 of the determination server 10 includes information indicating the presence of a symptom, the selection-instruction-information generating unit 36 generates the execution selection instruction information. The execution selection instruction information may only instruct the user to select whether to execute the UM-symptomatic process and may include a warning indicating the possibility of the symptomatic malfunction included in the determination information. The responsive-process selection instruction information is provided to cause the user to select any one of the responsive processes included in the process responsive information generated by the process-responsive-information generating unit 22 of the selection server 20. All of the responsive processes in the process responsive information may be selection candidate processes, and one or more responsive processes among the responsive processes in the process responsive information may be selection candidate processes.

The internal-information transmitting unit 41 of the image processing apparatus 40 transmits to the management server 100 an internal state, of the image processing apparatus 40, detected by the image processing apparatus 40. The internal-information transmitting unit 41 may transmit the internal information to the management server 100 regularly (for example, once a day) or irregularly.

The execution-request acquiring unit 42 of the image processing apparatus 40 receives from the user a request for executing a process such as copying, printing, or scanning.

The process-detail-information transmitting unit 43 of the image processing apparatus 40 transmits to the information collection server 30 process detail information indicating the detail of a process indicated by the execution request received by the execution-request acquiring unit 42.

The process-responsive-information acquiring unit 44 of the image processing apparatus 40 acquires from the information collection server 30 process responsive information generated by the process-responsive-information generating unit 22 of the selection server 20.

The selection-instruction-information acquiring unit 45 of the image processing apparatus 40 acquires from the information collection server 30 selection instruction information generated by the selection-instruction-information generating unit 36 of the information collection server 30.

The selection-instruction-information display 46 of the image processing apparatus 40 displays, on the display of the image processing apparatus 40, the selection instruction information acquired by the selection-instruction-information acquiring unit 45.

The selection unit 47 of the image processing apparatus 40 selects a process designated by the user from the selection instruction information displayed on the display by the selection-instruction-information display 46.

The process executing unit 48 of the image processing apparatus 40 executes a process in accordance with the execution request acquired by the execution-request acquiring unit 42. However, if the internal state indicated by the internal information satisfies the first condition that is less stringent than the second condition used for determining a malfunction, and if a process requested by the execution request acquired by the execution-request acquiring unit 42 is a related process, the process executing unit 48 restricts execution of the process requested through the execution request acquired by the execution-request acquiring unit 42. Specifically, when restricting the execution, the process executing unit 48 executes a process based on the process responsive information acquired by the process-responsive-information acquiring unit 44 or executes the process selected by the selection unit 47. The process executing unit 48 executes the process based on the process responsive information acquired by the process-responsive-information acquiring unit 44 in accordance with the user's selection of whether to execute a UM-symptomatic process in the execution selection instruction information for causing the user to select whether to execute a UM-symptomatic process. Specifically, in a case where the user selects to execute the UM-symptomatic process, the same process as the process detail in the process responsive information is executed among responsive processes. This leads to execution of the process requested by the user, without a change of the process. In a case where the user selects not to execute the UM-symptomatic process, a process corresponding to an alternative process in the process responsive information is executed among the responsive processes. The process executing unit 48 may execute a process corresponding to an alternative process preferentially selected by the alternative-process selecting unit 24 of the selection server 20 or a process corresponding to an alternative process selected by the user from multiple alternative candidate processes.

An example of a flow of a process executed by the information processing system 1 according to the present exemplary embodiment will be described with reference to a sequence chart in FIG. 8. In the example described herein, a user executes a process of copying an image by using the image processing apparatus 40.

The user first operates the image processing apparatus 40 to designate setting for copying an image that is a copying target. For example, double-sided printing, N-up printing (N pages printed on a single sheet), the number of copies, and the like are set. The execution-request acquiring unit 42 of the image processing apparatus 40 receives an execution request for an image copying process from the user (S1).

The process-detail-information transmitting unit 43 of the image processing apparatus 40 transmits, to the information collection server 30, process detail information indicating the detail of the process indicated by the execution request received in step S1 by the execution-request acquiring unit 42 of the image processing apparatus 40, and the internal-information transmitting unit 41 of the image processing apparatus 40 transmits, to the information collection server 30, internal information indicating the internal state of the image processing apparatus 40 (S2).

Figure 9:
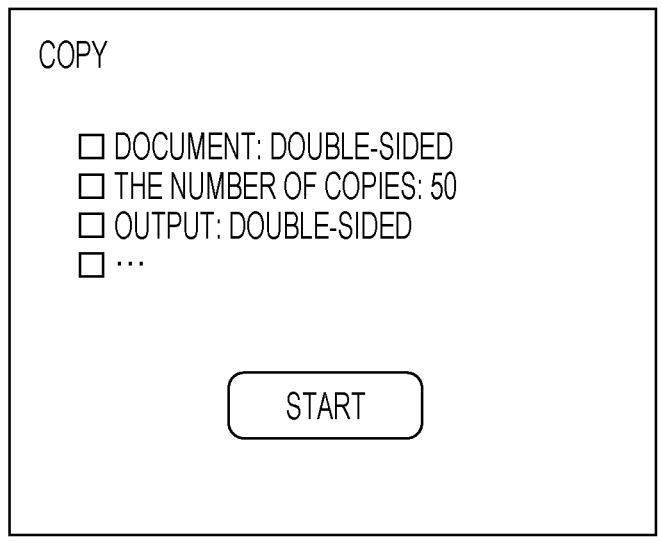
FIG. 9 is a diagram illustrating an example of a setting screen of the image processing apparatus.

FIG. 9 is a diagram illustrating an example of a setting screen of the image processing apparatus 40. As illustrated in FIG. 9, for example, "double-sided", "50", and "double-sided" are set as copy setting for document reading, the number of copies, and output, respectively. When the user selects the "start" button on the setting screen, the execution-request acquiring unit 42 of the image processing apparatus 40 receives the execution request for the copying process. The process detail information including information indicating the setting designated through the setting screen is transmitted to the information collection server 30.

The information acquiring unit 32 of the information collection server 30 acquires the process detail information and the internal information respectively transmitted by the process-detail-information transmitting unit 43 and the internal-information transmitting unit 41 of the image processing apparatus 40 and stores the information in the memory of the information collection server 30 (S3). The information output unit 34 of the information collection server 30 transmits to the determination server 10 the process detail information and the internal information acquired in step S3 (S4).

The determination-information generating unit 12 of the determination server 10 executes a determination-information generation process of generating determination information, on the basis of the internal information and the process detail information transmitted by the information collection server 30 (S5). The determination-information generation process executed by the determination-information generating unit 12 of the determination server 10 will be described with reference to the flowchart in FIG. 10.

Determination-Information Generation Process

Figure 10:
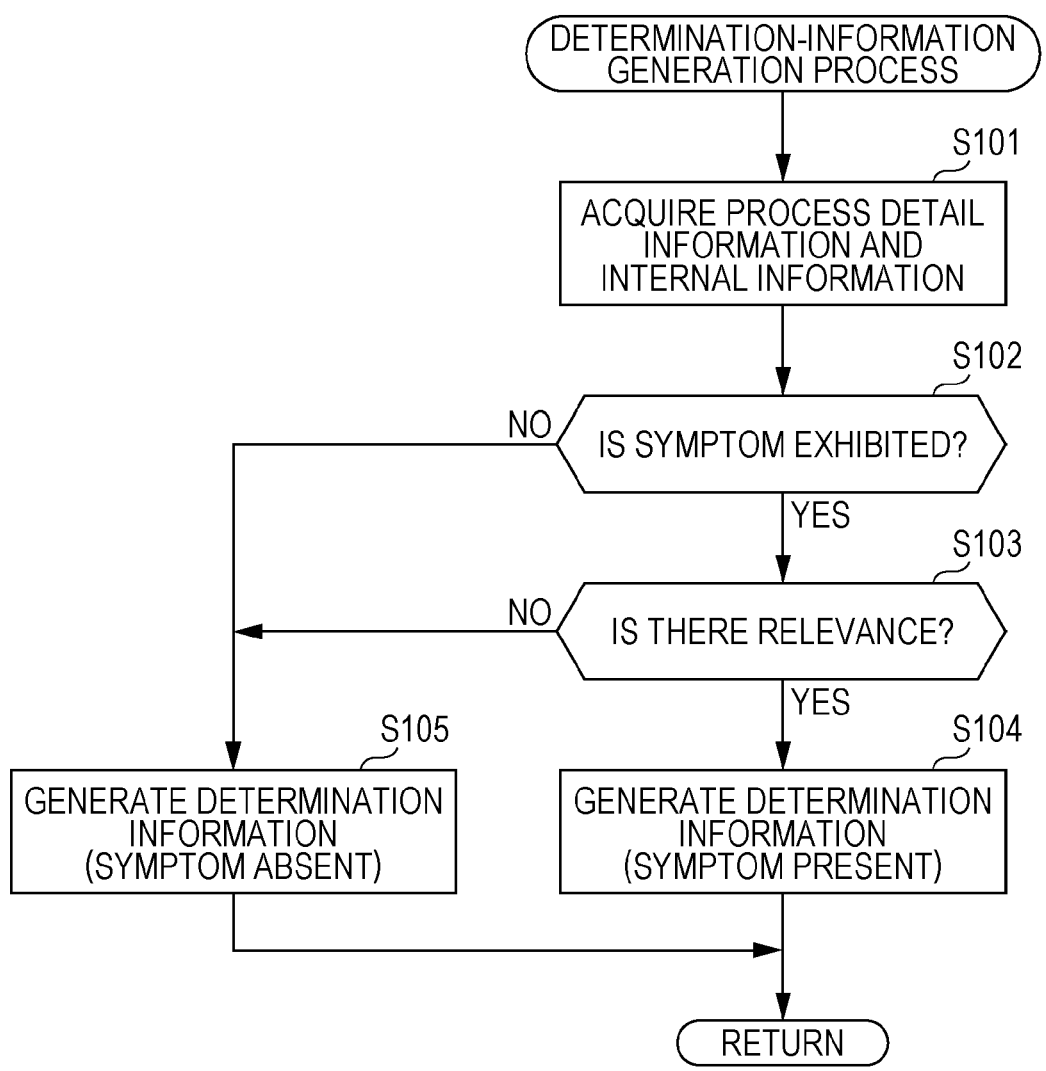
FIG. 10 is a flowchart illustrating an example of a flow of a determination-information generation process executed by a determination-information generating unit of the determination server.

As illustrated in FIG. 10, the determination-information generating unit 12 first acquires the internal information and the process detail information transmitted by the information collection server 30 (S101). The symptom determining unit 14 determines whether the acquired internal state indicated by the internal information satisfies the first condition that is less stringent than the second condition used for determining a malfunction of the image processing apparatus 40 (S102).

If it is determined in step S102 that the internal state indicated by the internal information acquired in step S101 satisfies the first condition (S102: YES), the relevance determining unit 16 determines whether there is relevance between the internal state determined to satisfy the first condition and the process indicated by the process detail information acquired in step S101 (S103).

If it is determined in step 103 that there is relevance between the internal state determined to satisfy the first condition in step S102 and the process indicated by the process detail information acquired in step S101, (S103: YES), the determination-information generating unit 12 generates determination information (S104). The determination information includes a determination result indicating the presence of a symptom of UM possibly caused by executing the process indicated by the process detail information acquired in step S101, the apparatus ID for identifying the image processing apparatus 40, the model information indicating the type of the image processing apparatus 40, and a symptomatic malfunction that exhibits a symptom of a malfunction. As specific determination information in this case, information as illustrated in FIG. 5 is generated in association with the apparatus ID "001", model information "N5100", a determination result "symptom present", a symptomatic malfunction "PaperFeedDupJam", and the process detail "output: double-sided" with one another. Then, the process returns to the copying process.

If it is determined in step 102 that the internal state indicated by the internal information acquired in step S101 does not satisfy the first condition (S102: NO), or if it is determined in step 103 that there is no relevance between the internal state determined to satisfy the first condition in step S102 and the process indicated by the process detail information acquired in step S101 (S103: NO), the determination-information generating unit 12 generates determination information (S105). The determination information includes a determination result indicating the absence of the symptom of UM possibly caused by executing the process indicated by the process detail information acquired in step S101, the apparatus ID for identifying the image processing apparatus 40, and the model information indicating the type of the image processing apparatus 40. Then, the process returns to the copying process.

The determination server 10 transmits the determination information generated in the determination-information generation process to the information collection server 30 (S6). The information acquiring unit 32 of the information collection server 30 acquires the determination information transmitted by the determination server 10 and stores the determination information in the memory of the information collection server 30. Next, if the determination information indicates the presence of a UM symptom (S7: YES), the information output unit 34 of the information collection server 30 transmits the determination information to the selection server 20 (S8), and the selection-instruction-information generating unit 36 of the information collection server 30 generates execution selection instruction information for causing the user to select whether to execute the process requested by the user through the execution request (S9). The execution selection instruction information is generated as image data displayable on the display of the image processing apparatus 40. The information output unit 34 of the information collection server 30 transmits, to the image processing apparatus 40, the execution selection instruction information generated by the selection-instruction-information generating unit 36 (S10).

When the selection server 20 acquires the determination information transmitted in step S8 by the information output unit 34 of the information collection server 30, the process-responsive-information generating unit 22 of the selection server 20 executes a process-responsive-information generation process (S11). The process-responsive-information generation process executed by the process-responsive-information generating unit 22 of the selection server 20 will be described with reference to a flowchart in FIG. 11.

Process-Responsive-Information Generation Process

Figure 11:
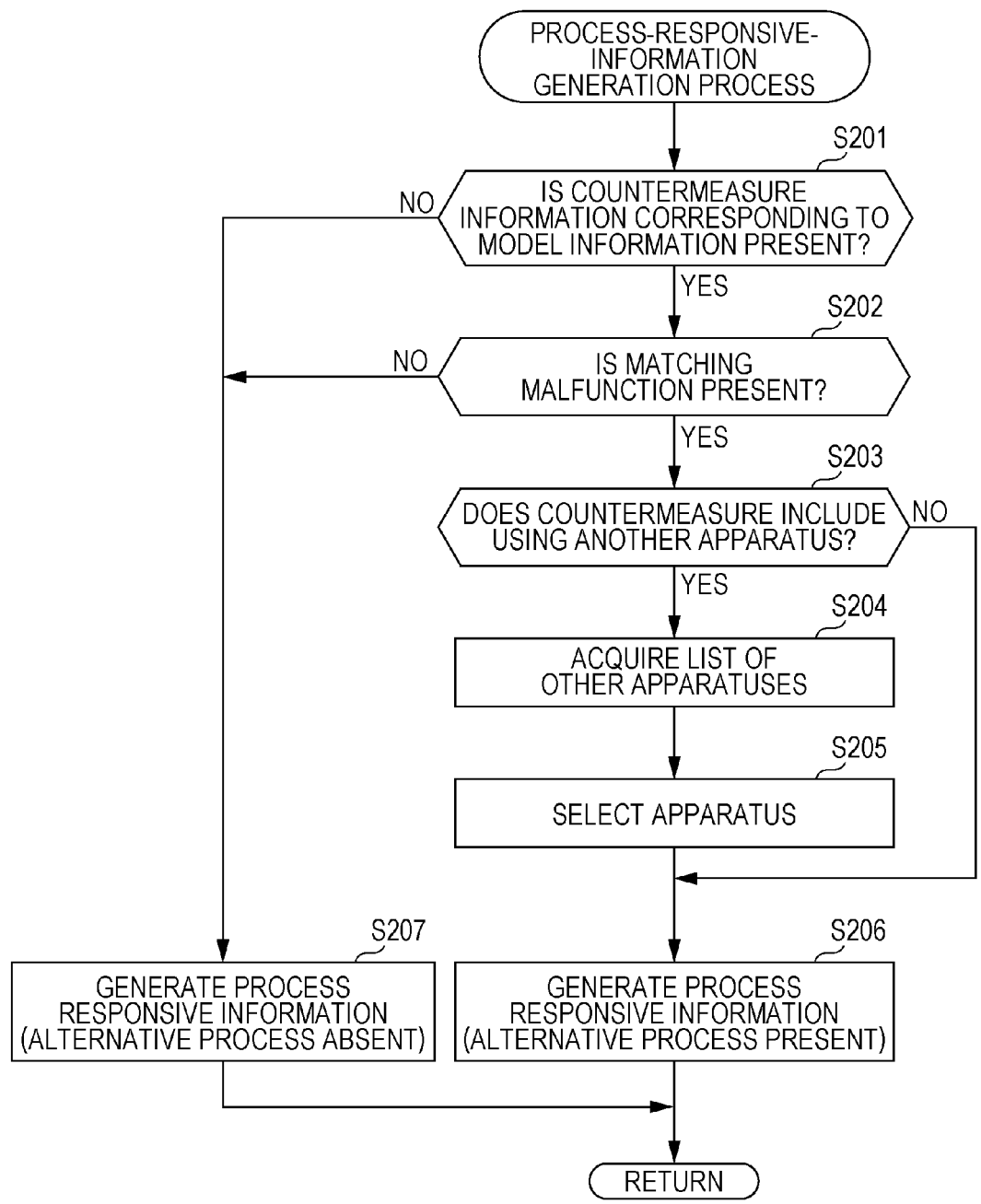
FIG. 11 is a flowchart illustrating an example of a flow of the process-responsive-information generation process executed by a process-responsive-information generating unit of the selection server.

As illustrated in FIG. 11, the process-responsive-information generating unit 22 first determines whether countermeasure information stored in the countermeasure-information memory 26 includes information corresponding to the model information in the determination information (S201). Here, whether the countermeasure information includes the model information "N5100" included in the determination information in FIG. 5 is determined by using the determination information in FIG. 5 and the countermeasure information in FIG. 6.

If it is determined in step 201 that the countermeasure information stored in the countermeasure-information memory 26 includes the information corresponding to the model information included in the determination information (S201: YES), the process-responsive-information generating unit 22 determines whether there is a match between a malfunction indicated by a UM occurrence cause associated with the information corresponding to the model information included in the determination information and a malfunction indicated by the symptomatic malfunction included in the determination information (S202).

If it is determined in step 202 that there is a match in the countermeasure information between a malfunction indicated by the UM occurrence cause associated with the information corresponding to the model information included in the determination information and a malfunction indicated by the symptomatic malfunction included in the determination information (S202: YES), the process-responsive-information generating unit 22 determines whether the countermeasure associated with the information includes using another image processing apparatus 40 (S203). In the countermeasure information illustrated in FIG. 6, information having a UM occurrence cause "PaperFeedDupJam" satisfies this condition in the information corresponding to the model information "N5100", and the countermeasures associated with the information are "output: single-sided" and "using another apparatus".

If it is determined in step 203 that the countermeasure includes using another image processing apparatus 40 (S203: YES), the alternative-process selecting unit 24 acquires a list of other image processing apparatuses 40 from the information collection server 30 (S204). From the list of other image processing apparatuses 40, the alternative-process selecting unit 24 selects an image processing apparatus 40 given high priority as an alternative to perform an alternative process (S205). The process-responsive-information generating unit 22 sets, as a UM-symptomatic process, a process indicated by the occurrence condition associated with the UM occurrence cause matching the malfunction indicated by the symptomatic malfunction included in the determination information and generates process responsive information having the countermeasure associated with the UM occurrence cause, as an alternative process (including an alternative process selected by the alternative-process selecting unit 24) (S206). Since the countermeasure information illustrated in FIG. 6 includes the countermeasure "using another apparatus", the alternative-process selecting unit 24 selects, from the list of other image processing apparatuses 40, an image processing apparatus 40 given high priority as the alternative (for example, the image processing apparatus 40 having the apparatus ID of 002) for an alternative process. As illustrated in FIG. 7, the process responsive information generated by the process-responsive-information generating unit 22 in this case includes "output: double-sided" as a process detail, "output: double-sided" as an identical process, and "output: single-sided", "used apparatus ID: 002", and "used apparatus ID: 004" as alternative processes.

If it is determined in step S203 that the countermeasure does not include using another image processing apparatus 40 (S203: NO), the process-responsive-information generating unit 22 sets, as a UM-symptomatic process, a process indicated by the occurrence condition associated with the UM occurrence cause matching the malfunction indicated by the symptomatic malfunction included in the determination information and generates process responsive information having the countermeasure associated with the UM occurrence cause, as an alternative process (S206).

If it is determined in step 201 that the countermeasure information stored in the countermeasure-information memory 26 does not include the information corresponding to the model information included in the determination information (S201: NO), or if it is determined in step 202 that there is no match in the countermeasure information between a malfunction indicated by the UM occurrence cause associated with the information corresponding to the model information included in the determination information and a malfunction indicated by the symptomatic malfunction included in the determination information (S202: NO), the process-responsive-information generating unit 22 generates process responsive information that does not include an alternative process (S207). The process responsive information generated by the process-responsive-information generating unit 22 in this case includes a process detail and an identical process that is a responsive process. Then, the process returns to the copying process.

The process responsive information generated in step S11 by the process-responsive-information generation process is transmitted to the information collection server 30 (S12). The information acquiring unit 32 of the information collection server 30 acquires the process responsive information transmitted by the selection server 20 and stores the process responsive information in the memory (S13). The selection-instruction-information generating unit 36 of the information collection server 30 generates responsive-process selection instruction information for causing the user to select a responsive process to be executed among responsive processes in the process responsive information stored in the memory (S14). Here, the responsive-process selection instruction information is generated as image data displayable on the display of the image processing apparatus 40.

The selection-instruction-information acquiring unit 45 of the image processing apparatus 40 acquires the execution selection instruction information transmitted in step S10 by the information output unit 34 of the information collection server 30, and the selection-instruction-information display 46 of the image processing apparatus 40 displays the acquired execution selection instruction information on the display of the image processing apparatus 40. If not executing the process requested by the user is selected on the basis of the execution selection instruction information displayed on the display (S15: NO), the selection-instruction-information acquiring unit 45 of the image processing apparatus 40 acquires the responsive-process selection instruction information transmitted by the information output unit 34 of the information collection server 30 (S16). The selection-instruction-information display 46 of the image processing apparatus 40 displays the acquired responsive-process selection instruction information on the display of the image processing apparatus 40.

The selection unit 47 of the image processing apparatus 40 selects a responsive process to be executed, on the basis of the responsive-process selection instruction information displayed on the display (S17). The process executing unit 48 of the image processing apparatus 40 executes a process corresponding to the selected responsive process (S18).

If execution of the process requested by the user is selected in step S15 on the basis of the execution selection instruction information displayed on the display of the image processing apparatus 40 (S15: YES), the process executing unit 48 executes the process requested by the user (S18).

If the determination information indicates the absence of a UM symptom in step S7 (S7: NO), the information collection server 30 transmits a process execution instruction to the image processing apparatus 40 (S19). In response to the process execution instruction, the process executing unit 48 executes the process requested by the user (S18).

Figure 12:
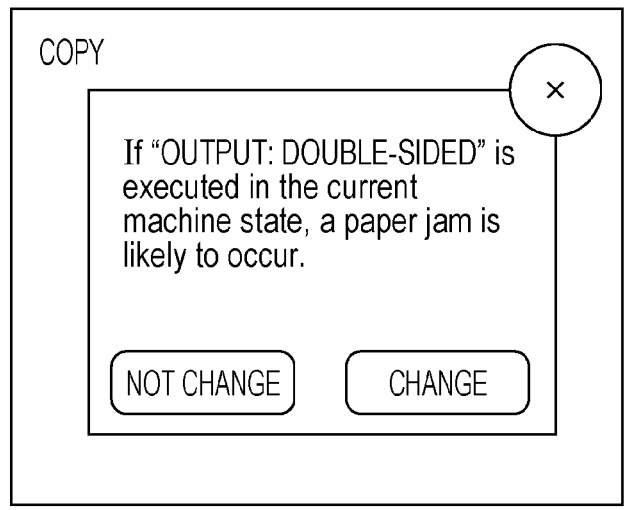
FIG. 12 is a diagram illustrating an example of execution selection instruction information.

FIG. 12 is a diagram illustrating an example of the execution selection instruction information. As illustrated in FIG. 12, the execution selection instruction information includes a warning and buttons, the warning indicating that execution of the process requested by the user might cause a malfunction (symptomatic malfunction) exhibiting a symptom of a UM occurrence, the buttons causing the user to select whether to execute the process requested by the user ("not change" and "change" in this case). If the user selects the button "not change", execution of the process requested by the user is selected. If the user selects the button "change", not executing the process requested by the user is selected. If the user selects the button "change" not to execute the process requested by the user, the responsive-process selection instruction information is displayed on the display.

Figure 13:
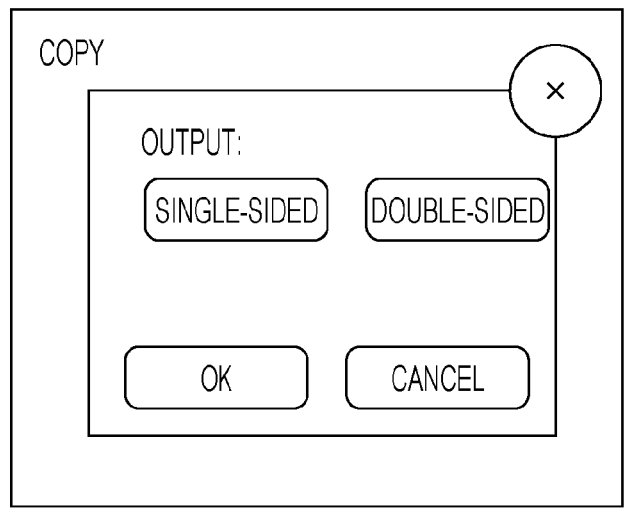
FIG. 13 is a diagram illustrating an example of responsive-process selection instruction information.

FIG. 13 is a diagram illustrating an example of the responsive-process selection instruction information. The responsive-process selection instruction information illustrated in FIG. 13 is generated on the basis of one of the responsive processes which is changing setting of the currently processing image processing apparatus 40, the responsive processes being in the process responsive information illustrated in FIG. 7. As illustrated in FIG. 13, the responsive-process selection instruction information includes buttons for selecting output setting among responsive processes included in the process responsive information (in this case, "single-sided" corresponding to an alternative process and "double-sided" corresponding to the process requested by the user). When the user selects the "single-sided" button and then the OK button, the selection unit 47 selects a responsive process with the output setting "single-sided". Then, the process executing unit 48 executes a copying process with output setting "single-sided", as the alternative process to the process requested by the user. When the user selects the "double-sided" button and then the OK button, the selection unit 47 selects a responsive process with output setting "double-sided". Then, the process executing unit 48 executes a copying process with output setting "double-sided" (the process requested by the user). Note that the "double-sided" button corresponding to the process requested by the user may be designed to be disabled when the user selects a responsive process.

Figure 14:
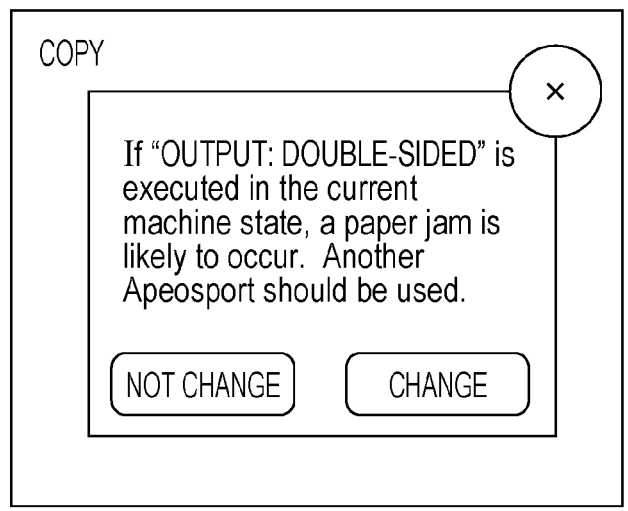
FIG. 14 is a diagram illustrating an example of the execution selection instruction information.
Figure 15:
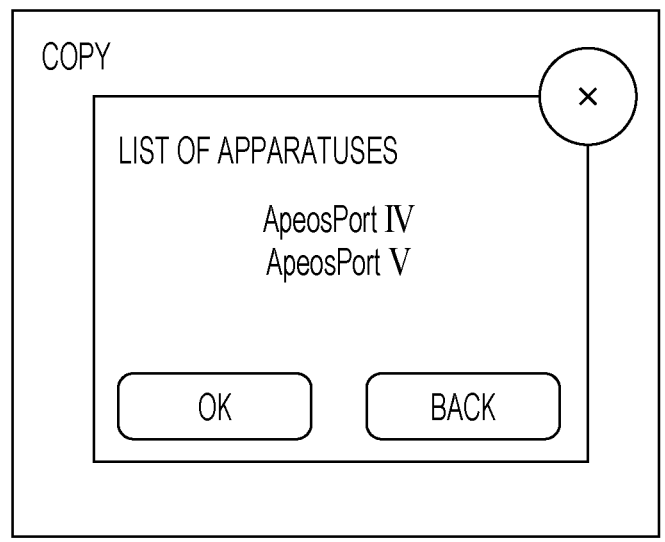
FIG. 15 is a diagram illustrating an example of the responsive-process selection instruction information.

The responsive-process selection instruction information may also be generated on the basis of a responsive process of using another image processing apparatus 40. In this case, execution selection instruction information as illustrated in FIG. 14 is displayed on the display on the basis of the process responsive information illustrated in FIG. 7. The execution selection instruction information includes a warning, a suggestion for selection of another image processing apparatus 40, and buttons for selecting whether to execute the process requested by the user (in this case, "not change" and "change"), the warning indicating the possibility of a malfunction (symptomatic malfunction) exhibiting a symptom of a UM occurrence. If the button "change" and then not executing the process requested by the user are selected, the responsive-process selection instruction information in FIG. 15 is displayed on the display. The responsive-process selection instruction information in FIG. 15 includes a list of other image processing apparatuses 40 that are ready to perform the alternative process (in this case, "ApeosPort IV" and "ApeosPort V" respectively representing "apparatus ID: 002" and "apparatus ID: 004" provided for the alternative process). If the user selects the "OK" button, the selection unit 47 selects the responsive process of using another image processing apparatus 40. Then, the process being executed by the current image processing apparatus 40 is terminated by the process executing unit 48 to execute the process by using another image processing apparatus 40.

In a case where an execution request for a process such as image printing is transmitted from a terminal device such as a personal computer to an image processing apparatus 40, printing setting might be designated through the terminal device. In such a case, execution selection instruction information and responsive-process selection instruction information are displayed on the display of the terminal device. In a case where the responsive-process selection instruction information includes a list of apparatuses for selecting another image processing apparatus 40, the responsive-process selection instruction information may include a button for selecting another image processing apparatus 40.

Figure 16:
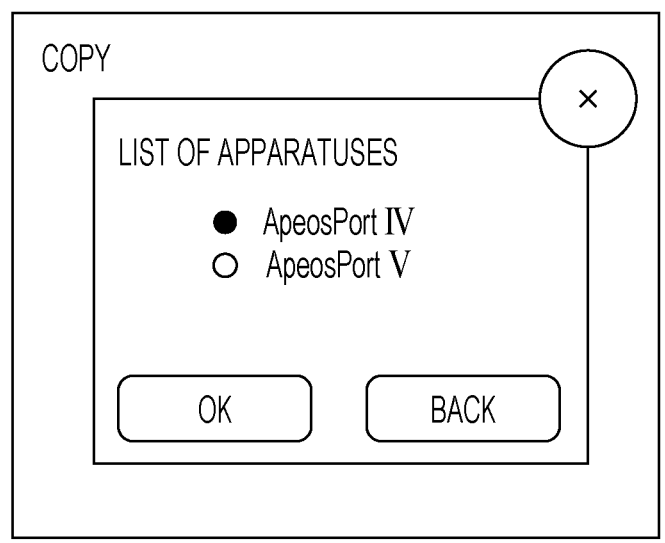
FIG. 16 is a diagram illustrating an example of the responsive-process selection instruction information displayed on a display of a terminal device.

FIG. 16 is a diagram illustrating an example of the responsive-process selection instruction information displayed on the display of the terminal device. The responsive-process selection instruction information illustrated in FIG. 16 is generated on the basis of the process responsive information illustrated in FIG. 7. As illustrated in FIG. 16, the responsive-process selection instruction information includes a list of other image processing apparatuses 40 that are ready to perform the alternative process (in this case, "ApeosPort IV" and "ApeosPort V" respectively representing "apparatus ID: 002" and "apparatus ID: 004" provided for the alternative process), and selection buttons (circular buttons in this case) displayed next to the apparatus names, the selection buttons being for selecting one of the apparatuses. When the user selects one of the buttons for the corresponding apparatus (for example, a selection button for "ApeosPort IV") and the "OK" button, a responsive process of using "ApeosPort IV" as the image processing apparatus 40 is selected, and the requested process is executed by the image processing apparatus 40 "ApeosPort IV".

The responsive-process selection instruction information may be generated to include a responsive process of changing setting of the currently processing image processing apparatus 40 and a responsive process of using another image processing apparatus 40. In addition, the list of other image processing apparatuses 40 may include information indicating the states of the image processing apparatuses 40. In this case, the user selects an image processing apparatus 40 to be used, depending on the states of the image processing apparatuses 40.

Note that an exemplary embodiment of the present invention is not limited to the aforementioned exemplary embodiment.

For example, the information collection server 30, the selection server 20, and the determination server 10 are separate devices in the described example, but may be incorporated into one device.

The execution of the processes respectively performed by the symptom determining unit 14 of the determination server 10 and by the process-responsive-information generating unit 22 of the selection server 20 are not limited to the example in which the processes are executed in response to the process execution request from the image processing apparatus 40. The processes may be executed in advance when the information collection server 30 acquires internal information from the image processing apparatus 40. In this case, the information collection server 30 may acquire only process detail information in response to the process execution request from the image processing apparatus 40 and may execute the other processes on the basis of results of the symptom determination process and the process-responsive-information generation process that have been executed in advance.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a memory storing: (i) a plurality of malfunction information each indicating a predetermined symptom of a malfunction of an information processing apparatus, and (ii) a plurality of countermeasure information each indicating an alternative process corresponding to each predetermined symptom of the malfunction of the information processing apparatus; and
a processor programmed to:
acquire internal information indicating an internal state of an information processing apparatus;
acquire, from a user, an execution request for a process to be executed;
execute the process in accordance with the acquired execution request;
when the acquired internal information indicates a symptom of a malfunction occurrence in the information processing apparatus relating to a paper jam, and the requested process is determined to affect the malfunction occurrence, prior to the malfunction occurrence occurring, request an input on a display of the information processing apparatus to select between performing the requested process and performing an alternative process performed on the information processing apparatus; and
in response to a selection by the received input, perform either the requested process or the alternative process.

2. The information processing system according to claim 1, wherein the requesting the input on the display to select between performing the requested process and performing an alternative process occurs before starting the requested process.

3. The information processing system according to claim 2, wherein:
the memory stores the alternative process in association with a process; and
performing the alternative process includes executing, instead of the requested process, the alternative process associated with the requested process.

4. The information processing system according to claim 3, wherein:
the process is associated with a plurality of alternative processes; and
in response to the selection by the received input of the alternative process, the processor executes one of the plurality of alternative processes that is selected based on priority.

5. The information processing system according to claim 4, wherein:
the processor is programmed to output selection instruction information causing the user to select the one of the plurality of the alternative processes that is to be executed; and
in response to the selection by the received input of the alternative process, the processor executes the alternative process selected by the user.

6. The information processing system according to claim 1, wherein:
the memory stores the alternative process in association with a process; and
performing the alternative process includes executing, instead of the requested process, the alternative process associated with the requested process.

7. The information processing system according to claim 6, wherein:
the process is associated with a plurality of alternative processes; and
in response to the selection by the received input of the alternative process, the processor executes one of the plurality of alternative processes that is selected based on priority.

8. The information processing system according to claim 7, wherein:
the processor is programmed to output selection instruction information causing the user to select the one of the plurality of the alternative processes that is to be executed; and
in response to the selection by the received input of the alternative process, the processor executes the alternative process selected by the user.

9. The information processing system according to claim 1, wherein the information processing apparatus is a printer.

10. A non-transitory computer readable medium storing a program causing a computer to execute a process comprising:
acquiring internal information indicating an internal state of an information processing apparatus;
acquiring, from a user, an execution request for a process to be executed;
executing the process in accordance with the acquired execution request;

when the acquired internal information indicates a symptom of a malfunction occurrence in the information processing apparatus relating to a paper jam, and the requested process is determined to affect the malfunction occurrence, prior to the malfunction occurrence occurring, requesting an input on a display of the information processing apparatus to select between performing the requested process and performing an alternative process performed on the information processing apparatus; and in response to a selection by the received input, performing either the requested process or the alternative process.

11. The process according to claim 10, wherein the information processing apparatus is a printer.

12. An information processing method comprising:

acquiring internal information indicating an internal state of an information processing apparatus;

acquiring, from a user, an execution request for a process to be executed;

executing the process in accordance with the acquired execution request;

when the acquired internal information indicates a symptom of a malfunction occurrence in the information processing apparatus relating to a paper jam, and the requested process is determined to affect the malfunction occurrence, prior to the malfunction occurrence occurring, requesting an input on a display of the information processing apparatus to select between performing the requested process and performing an alternative process performed on the information processing apparatus; and in response to a selection by the received input, performing either the requested process or the alternative process.

13. The information processing method according to claim 12, wherein the information processing apparatus is a printer.

* * * * *